US008934231B2

(12) United States Patent
Liu et al.

(10) Patent No.: US 8,934,231 B2
(45) Date of Patent: Jan. 13, 2015

(54) HINGE FIXING STRUCTURE FOR FIXING A HINGE AND DISPLAY DEVICE THEREWITH

(75) Inventors: Cheng-Shing Liu, New Taipei (TW); Jen-Hao Liu, New Taipei (TW); Jen-Feng Lin, New Taipei (TW); Jhih-Hong Wang, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 500 days.

(21) Appl. No.: 13/454,108

(22) Filed: Apr. 24, 2012

(65) Prior Publication Data

US 2013/0070398 A1 Mar. 21, 2013

(30) Foreign Application Priority Data

Sep. 19, 2011 (TW) .............................. 100133596 A

(51) Int. Cl.
| | | |
|---|---|---|
| *H05K 5/00* | (2006.01) | |
| *H05K 7/00* | (2006.01) | |
| *H04N 7/14* | (2006.01) | |
| *H04N 13/04* | (2006.01) | |
| *E05C 7/00* | (2006.01) | |
| *A47B 96/06* | (2006.01) | |
| *G06F 1/16* | (2006.01) | |

(52) U.S. Cl.
CPC .................................... *G06F 1/1601* (2013.01)
USPC ............ 361/679.27; 361/679.26; 361/679.28; 361/679.29; 348/14.07; 348/52; 292/44; 292/45; 248/316.5; 248/292.14; 248/229.22

(58) Field of Classification Search
USPC ............... 361/679.01–679.09, 679.1–679.19, 361/679.21–679.29, 679.31–679.45, 361/679.55–679.6, 724–747; 348/14.07, 348/51–52, 177, 333.01–333.13, 739; 248/917–924, 80–88, 155.1–155.5, 248/166–173, 180.1–186.2, 229.1–231.51, 248/271.4, 292.14, 316.1–316.8; 292/1–62, 292/113, 169.11–169.23, 341.11–341.19; 369/75.1, 75.2, 75.11, 75.21, 76, 369/77.11, 77.21, 78, 79, 80, 81, 82
See application file for complete search history.

(56) References Cited

U.S. PATENT DOCUMENTS

| | | | |
|---|---|---|---|
| 7,602,606 B2 | 10/2009 | Schlesener | |
| 8,573,911 B2 * | 11/2013 | Degner et al. ................. | 411/106 |

(Continued)

FOREIGN PATENT DOCUMENTS

TW          347487          12/1998

OTHER PUBLICATIONS

Dell Computer, "Dell latitude CP and Cpi service manual", Dell Inc., Aug. 1998, 1994-1998 Dell Computer Corporation.
Dell Computer, "Dell Inspiron XPS and Inspiron 9100 Service Manual", Dell Inc., Feb. 28, 2004.

(Continued)

*Primary Examiner* — Jerry Wu
(74) *Attorney, Agent, or Firm* — Winston Hsu; Scott Margo

(57) ABSTRACT

A hinge fixing structure includes a bezel whereon an opening is formed, and a cover whereon a slot is formed. The hinge fixing structure includes a hinge whereon a hole is formed, and a protrusion bolt. The protrusion bolt includes a fixing portion installed inside the slot on the cover in a tight fit manner, and a protruding portion connected to a side of the fixing portion and passing through the hole of the hinge. The hinge fixing structure further includes a screwing component for passing through the opening on the bezel and being screwed inside the protrusion blot at an end, so as to fix relative position of the bezel, the hinge and the cover.

10 Claims, 5 Drawing Sheets

(56) References Cited

U.S. PATENT DOCUMENTS

2008/0212293 A1* 9/2008 Li et al. .................... 361/748
2010/0265427 A1* 10/2010 Chiu et al. ................. 349/58
2012/0160978 A1* 6/2012 Chiu et al. ............... 248/309.1

OTHER PUBLICATIONS

Office action mailed on Sep. 23, 2013 for the Taiwan application No. 100133596, filed: Sep. 19, 2011, p. 1 line 13~14, p. 2 line 1~17 and line 23~26 and p. 3 line 1~3 and line 11~16.

* cited by examiner

HINGE FIXING STRUCTURE FOR FIXING A HINGE AND DISPLAY DEVICE THEREWITH

BACKGROUND OF THE INVENTION

1. Field of the Invention

The present invention relates to a hinge fixing structure for fixing a hinge, and more specifically, to a hinge fixing structure for fixing a hinge with a protrusion bolt embedded in a bezel and a cover.

2. Description of the Prior Art

With the rapid development of technology, light, power-saving, and portable intelligent information products play increasingly important roles in our lives. For example, the flat display module is an important component of these products. The LCD display module has the advantages of low power consumption, small volume and no radiation pollution, thus the LCD display module has been widely utilized in notebooks, PDAs, cell phones and other portable information products. In addition, the LCD display module is gradually replacing CRT monitors and traditional TVs. In tradition, a bezel of a display device is often made of metal material or plastic material with quite weight and thickness for consideration of assembly strength, which affects light-weight and small-size development of the display device. For example, a screwing means for screwing a hinge of the display device increases total thickness of the display device. Therefore, there is a need to provide a thinner and firmer display device to meet the light-weight and small-size requirements of consumer products.

SUMMARY OF THE INVENTION

The present invention provides a hinge fixing structure for fixing a hinge with a protrusion bolt embedded in a bezel and a cover to solve the problems mentioned above.

According to the claimed invention, a hinge fixing structure includes a bezel whereon an opening is formed, and a cover whereon a slot is formed. The hinge fixing structure includes a hinge whereon a hole is formed, and a protrusion bolt. The protrusion bolt includes a fixing portion installed inside the slot on the cover in a tight fit manner, and a protruding portion connected to a side of the fixing portion and passing through the hole of the hinge. The hinge fixing structure further includes a screwing component for passing through the opening on the bezel and being screwed inside the protrusion blot at an end, so as to fix relative position of the bezel, the hinge and the cover.

According to the claimed invention, a sunken portion is further formed on the bezel and around the opening for containing the other end of the screwing component as the end of screwing component is screwed inside the protrusion blot.

According to the claimed invention, an outer diameter of the fixing portion is substantially greater than an outer diameter of the protruding portion.

According to the claimed invention, a plurality of threads is formed on the fixing portion of the protrusion bolt for engaging inside the slot on the cover.

According to the claimed invention, the protrusion bolt is an eyelet bolt.

According to the claimed invention, the hinge fixing structure further includes a bracket for covering the hinge.

According to the claimed invention, a display device includes a display panel and a hinge fixing structure. The hinge fixing structure includes a bezel whereon an opening is formed, and a cover whereon a slot is formed for covering the display panel cooperatively with the bezel. The hinge fixing structure further includes a hinge whereon a hole is formed, and a protrusion bolt. The protrusion bolt includes a fixing portion installed inside the slot on the cover in a tight fit manner, and a protruding portion connected to a side of the fixing portion and passing through the hole of the hinge. The hinge fixing structure further includes a screwing component for passing through the opening on the bezel and being screwed inside the protrusion blot at an end, so as to fix relative position of the bezel, the hinge and the cover.

The hinge fixing structure of the present invention utilizes the protrusion bolt embedded in the bezel and the cover to fasten the hinge, and it will not increase total thickness of the bezel, the hinge and the cover of the display device and can keep enough assembly strength of the screwing component with necessary thickness. Therefore, the present invention provides the hinge fixing structure and display device therewith with small space, easy assembly and assembly strength.

These and other objectives of the present invention will no doubt become obvious to those of ordinary skill in the art after reading the following detailed description of the embodiment that is illustrated in the various figures and drawings.

DETAILED DESCRIPTION

Figure 1:
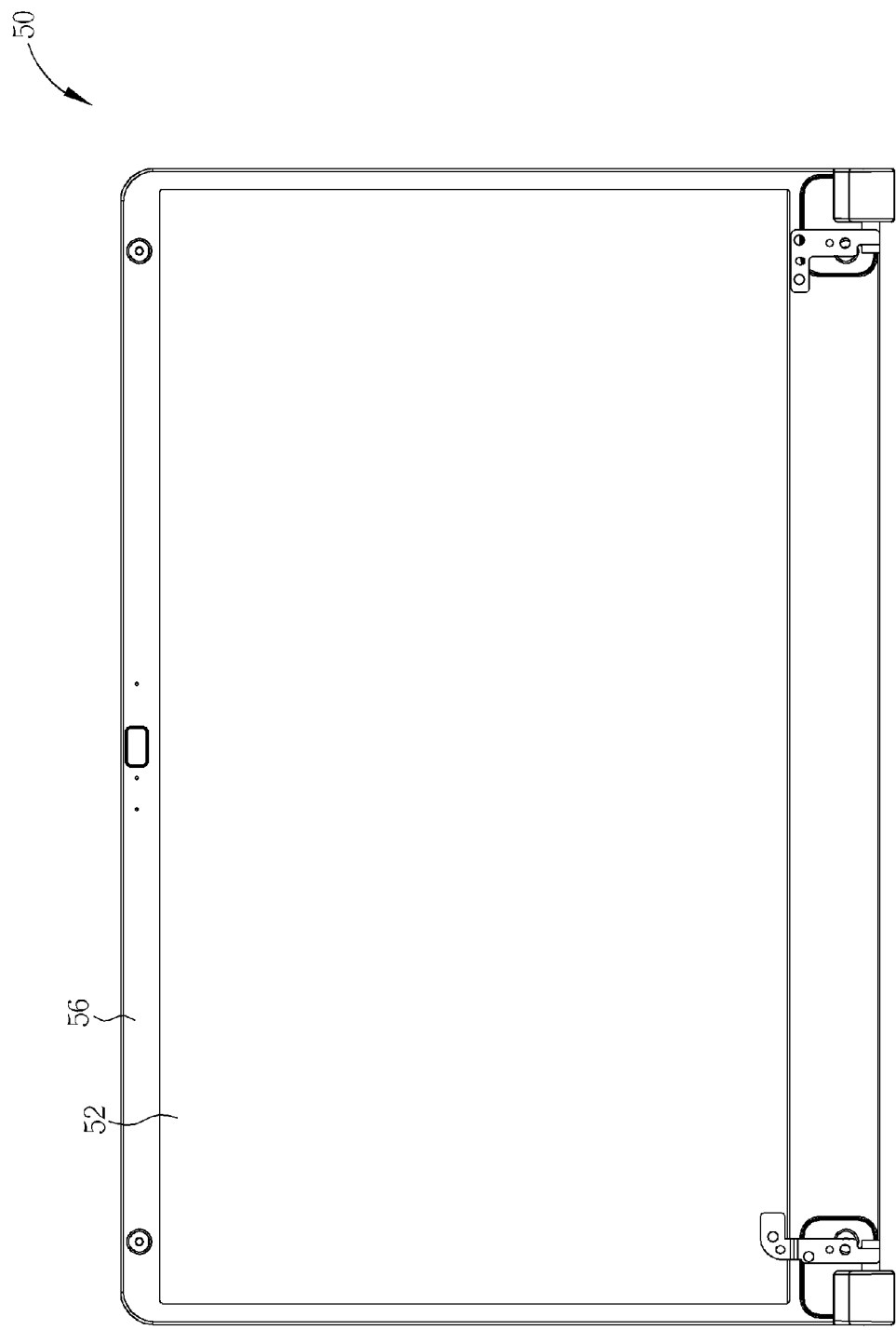
FIG. 1 is a schematic drawing of a display device according to an embodiment of the present invention.
Figure 2:
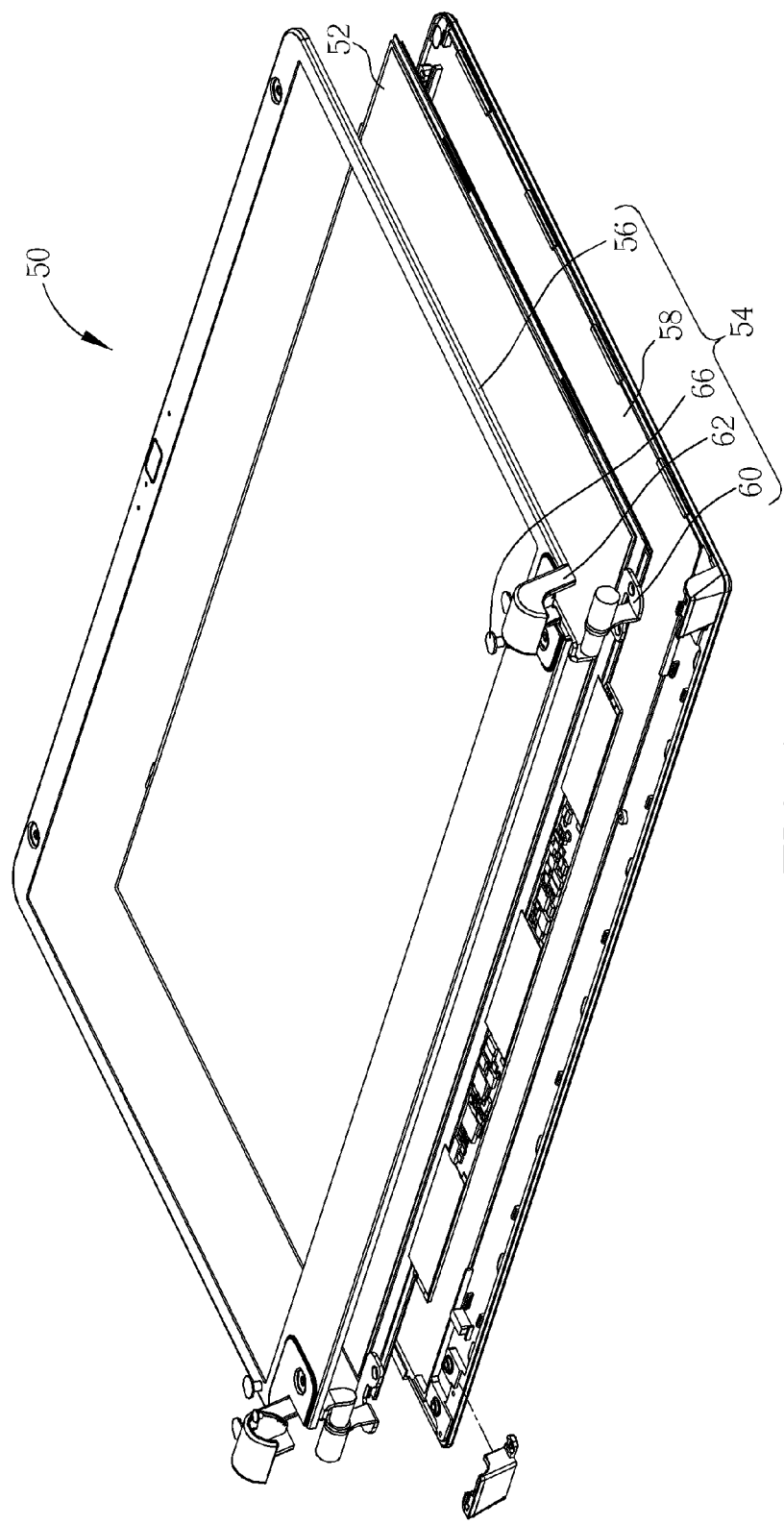
FIG. 2 is an exploded drawing of the display device according to the embodiment of the present invention.

Please refer to FIG. 1 and FIG. 2. FIG. 1 is a schematic drawing of a display device 50 according to an embodiment of the present invention. FIG. 2 is an exploded drawing of the display device 50 according to the embodiment of the present invention. The display device 50 can be an LCD monitor of a notebook computer. The display device 50 includes a display panel 52, which can be a LCD panel. The display device 50 further includes a hinge fixing structure 54 for fixing a hinge. The hinge fixing structure 54 includes a bezel 56 and a cover 58 for covering the display panel 52 cooperatively with the bezel 56. The bezel 56 and the cover 58 can be made of metal material, such as Al alloy or Mg—Al alloy. The cover 58 can be manufactured by CNC cutting process. The bezel 56 and the cover 58 also can be made of plastic material, and it depends on actual design demand. The hinge fixing structure 54 further includes at least one hinge 60 for pivoting the display device 50 relative to a host device. The hinge fixing structure 54 further includes at least one bracket 62 for covering the corresponding hinge 60 so as to protect the hinge 60.

Figure 3:
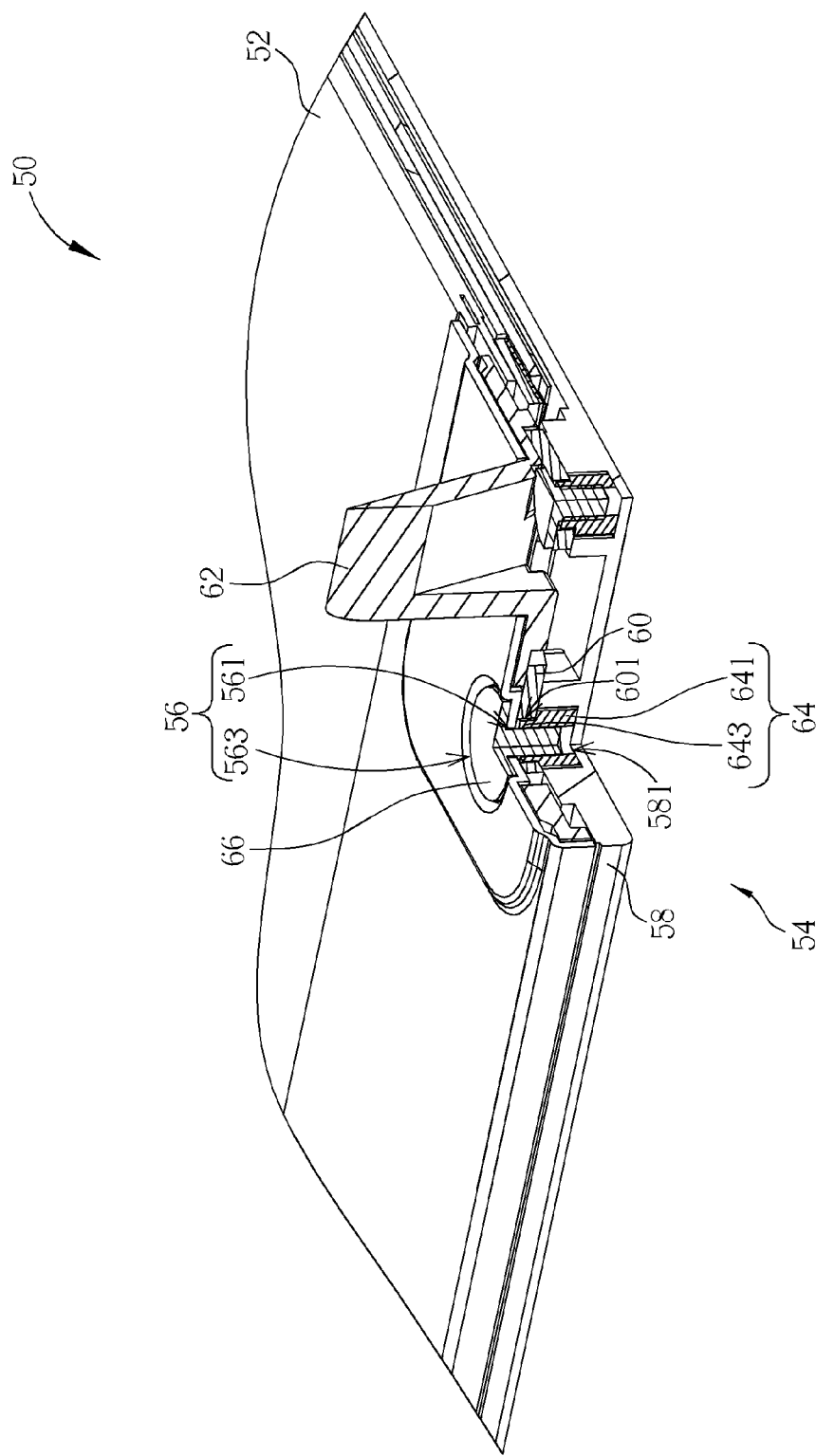
FIG. 3 is a partial sectional view of the display device according to the embodiment of the present invention.
Figure 4:
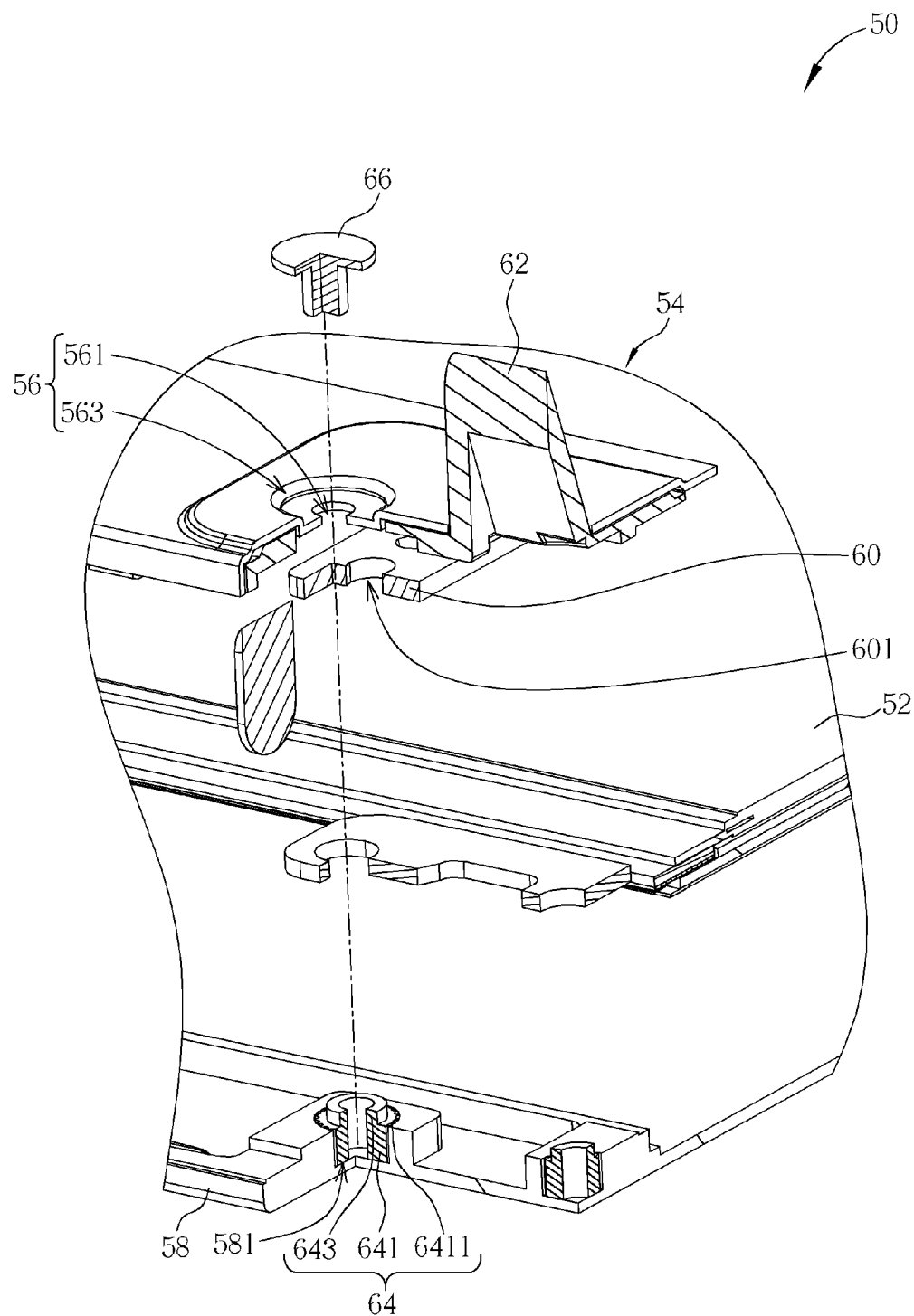
FIG. 4 is a partial sectional and exploded drawing of the display device according to the embodiment of the present invention.
Figure 5:
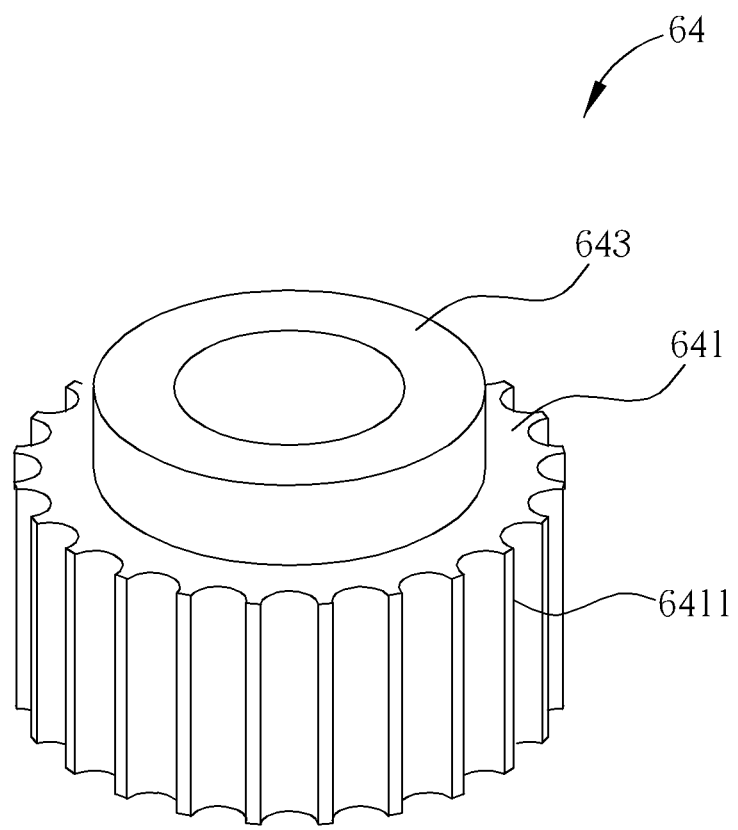
FIG. 5 is a diagram of a protrusion bolt according to the embodiment of the present invention.

Please refer to FIG. 3 and FIG. 4. FIG. 3 is a partial sectional view of the display device 50 according to the embodiment of the present invention. FIG. 4 is a partial sectional and exploded drawing of the display device 50 according to the embodiment of the present invention. At least one opening 561 and at least one sunken portion 563 are formed on the bezel 56, and the sunken portion 563 is disposed around the opening 561. At least one slot 581 is formed on the cover. A hole 601 is formed on the hinge 60. The opening 561 on the bezel 56, the hole 601 on the hinge 60 and the slot 581 on the cover 58 are aligned with one another. The hinge fixing structure 54 further includes at least one protrusion bolt 64, which can be an eyelet bolt. Please refer to FIG. 3 to FIG. 5. FIG. 5 is a diagram of the protrusion bolt 64 according to the embodiment of the present invention. The protrusion bolt 64 includes a fixing portion 641 installed inside the slot 581 on the cover 58 in a tight fit manner. For example, a plurality of threads 6411 can be formed on the fixing portion 641 of the protrusion bolt 64 for engaging inside the slot 581 on the cover 58 so that the protrusion bolt 64 is fastened on the cover 58 in a tight fit manner. The protrusion bolt 64 also can be riveted on the cover 58. The fixing mechanism of the protrusion bolt 64 and the cover 58 is not limited to the above-mentioned embodiment, and it depends on actual design demand. Furthermore, the protrusion bolt 64 further includes a protruding portion 643 connected to a side of the fixing portion 641 and passing through the hole 601 of the hinge 60. An outer diameter of the fixing portion 641 of the protrusion bolt 64 can be substantially greater than an outer diameter of the protruding portion 643.

The hinge fixing structure 54 further includes a screwing component 66 for passing through the opening 561 on the bezel 56 and being screwed inside the protrusion blot 64 at an end, so as to fix relative position of the bezel 56, the hinge 60 and the cover 58. The screwing component 66 can be a screw. When the end of the screwing component 66 is screwed inside the protrusion blot 64, the sunken portion 563 on the bezel 56 can contain the other end of the screwing component 66, such as a nut, so as to prevent the screwing component 66 from protruding out of a surface on the bezel 56. In conclusion, the protrusion bolt 64 is embedded in the bezel 56, the hinge 60 and the cover 58, which does not increase total thickness of the bezel 56, the hinge 60 and the cover 58 of the display device 50 and keeps enough assembly strength of the screwing component 66 with necessary thickness.

In contrast to the prior art, the hinge fixing structure of the present invention utilizes the protrusion bolt embedded in the bezel and the cover to fasten the hinge, and it will not increase total thickness of the bezel, the hinge and the cover of the display device and can keep enough assembly strength of the screwing component with necessary thickness. Therefore, the present invention provides the hinge fixing structure and display device therewith with small space, easy assembly and assembly strength.

Those skilled in the art will readily observe that numerous modifications and alterations of the device and method may be made while retaining the teachings of the invention.

What is claimed is:

1. A hinge fixing structure, comprising:
a bezel whereon an opening is formed;
a cover combined with the bezel for sandwiching a display panel, a slot being formed on the cover through a top surface;
a hinge whereon a hole is formed; a protrusion bolt comprising: a fixing portion with one side embedded inside the slot and flushed with the top surface on the cover in a tight fit manner; wherein a plurality of straight threads is formed on the fixing portion for engaging inside the slot; and
a protruding portion connected to an opposite side of the fixing portion and passing through the hole of the hinge and an opening of the display panel; and a screwing component for passing through the opening on the bezel and being screwed inside the protrusion bolt at an end, so as to fix relative position of the bezel, the hinge and the cover.

2. The hinge fixing structure of claim 1, wherein a sunken portion is further formed on the bezel and around the opening for containing the other end of the screwing component as the end of screwing component is screwed inside the protrusion blot.

3. The hinge fixing structure of claim 1, wherein an outer diameter of the fixing portion is substantially greater than an outer diameter of the protruding portion.

4. The hinge fixing structure of claim 1, wherein the protrusion bolt is an eyelet bolt.

5. The hinge fixing structure of claim 1, further comprising a bracket for covering the hinge.

6. A display device comprising: a display panel with an opening; and a hinge fixing structure comprising: a bezel whereon an opening is formed;
a cover combined with the bezel for covering the display panel cooperatively with the bezel, a slot being formed on the cover through a top surface; a hinge whereon a hole is formed;
a protrusion bolt comprising: a fixing portion with one side embedded inside the slot and flushed with the top surface on the cover in a tight fit manner; wherein a plurality of straight threads is formed on the fixing portion for engaging inside the slot; and a protruding portion connected to an opposite side of the fixing portion and passing through the hole of the hinge and the opening of the display panel; and a screwing component for passing through the opening on the bezel and being screwed inside the protrusion bolt at an end, so as to fix relative position of the bezel, the hinge and the cover.

7. The display device of claim 6, wherein a sunken portion is further formed on the bezel and around the opening for containing the other end of the screwing component as the end of screwing component is screwed inside the protrusion blot.

8. The display device of claim 6, wherein an outer diameter of the fixing portion is substantially greater than an outer diameter of the protruding portion.

9. The display device of claim 6, wherein the protrusion bolt is an eyelet bolt.

10. The display device of claim 6, further comprising a bracket for covering the hinge.

* * * * *